F. A. KUMMER.
PROCESS OF EXTRACTING VOLATILE PRODUCTS FROM WOOD.
APPLICATION FILED APR. 24, 1906.
984,818.
Patented Feb. 21, 1911
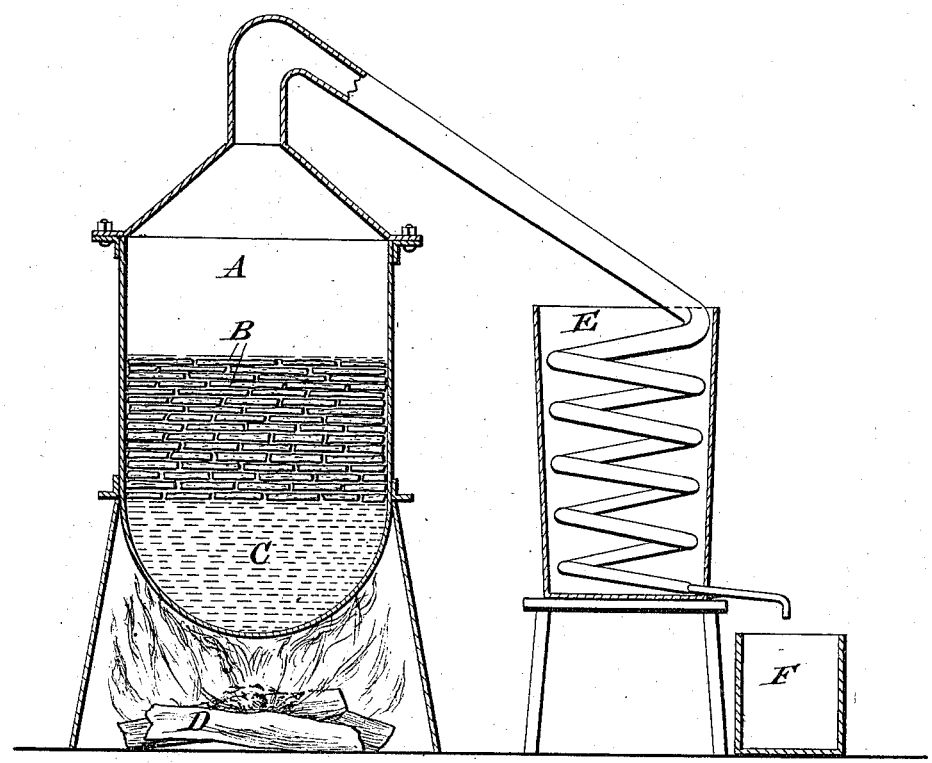
Witnesses:
Henry P. Bridges
A. Walter Pressgraves.
Inventor:
Frederick A. Kummer

UNITED STATES PATENT OFFICE.

FREDERICK A. KUMMER, OF NEW YORK, N. Y.

PROCESS OF EXTRACTING VOLATILE PRODUCTS FROM WOOD.

984,818.

Specification of Letters Patent. Patented Feb. 21, 1911.

Application filed April 24, 1906. Serial No. 313,510.

*To all whom it may concern:*

Be it known that I, FREDERICK A. KUMMER, a citizen of the United States, residing at New York, in the county of New York and State of New York, have invented certain new and useful Improvements in the Process of Extracting Volatile Products from Wood, of which the following is a specification.

This invention relates to an improved process of extracting the volatile constituents such as turpentine from resinous or terebinthine woods.

The process, briefly stated, consists of immersing resinous wood in a bath of rosin oil in a suitable receptacle, heating the bath to the point of distillation of the volatile products and condensing the said volatile products.

In carrying out the process practically, a suitable retort or receptacle is employed that is liquid-and-vapor-tight and provided with a condensing worm; the rosin oil is placed in the retort, and the resinous wood having been cut to suitable sizes is placed in the retort and immersed in the rosin oil. Heat is then applied to the bath and continued until the distillation of the volatile products ensues and the turpentine and other condensed vapors pass from the worm and cease.

In the accompanying drawing, which is for the purpose of illustration only, the wood to be treated (B) is placed in the closed liquid-and-vapor-tight retort (A) arranged to permit the introduction and removal of the contents, and connected with a condensing coil (E). Rosin oil is introduced (C) sufficient to cover the wood (B) or the wood may be immersed in the rosin oil; heat is applied at (D) and the condensed vapors collected in a receptacle (F). The condensed volatile products or distillate, which separates by gravity from the water distilled during the process, is removed, and separated into turpentine and other products by ordinary methods of distillation.

Rosin oil as a bath for distilling resinous woods to obtain the volatile products thereof, possesses a combination of the following desirable qualities not found in any bath substance heretofore used for this purpose: First, it is fluid at ordinary atmospheric temperatures; second, it possesses a boiling temperature higher than that of the products sought to be obtained; third, it has no contaminating influence upon the volatilized resultant products; fourth, because of the fact that rosin oil is itself derived from resinous wood, it forms a simple mixture with the rosin exuding from the wood, which mixture, by the further application of heat, may be distilled off as simple rosin oil for use as bath in subsequent operations.

First: The advantages of a bath medium which is fluid at ordinary temperatures are, that (*a*) it does not require to be first melted or heated in order to make it a liquid bath, thus saving fuel, time and energy; (*b*) it will flow hot or cold into the retort, and may thus be utilized to regulate or to effect rapid changes of the temperature of the bath if desired; (*c*) it does not solidify and cake in the apparatus in case the heat is withdrawn by accident or design.

Second: The bath of rosin oil also possesses the requisite characteristic of a boiling temperature higher than that of the product which is to be extracted from the wood, whereby the volatile products are driven off in vapors, the bath remaining liquid. In conducting the operation, the evaporation of the desired products will be secured if the bath is raised to and maintained at a temperature at which such products boil. In practice, the operation may be hastened by raising the bath to a temperature higher than the boiling temperature of the products provided it be not raised to such a degree as to cause destructive distillation of the wood. The wood is thus more quickly raised to the required temperature by more rapid absorption of heat from the bath. For example, I have found that a temperature varying from 325 to 350 degrees Fahrenheit may be advantageously used; but my invention is not restricted to the use of the above temperatures, which are cited for illustration only. The rosin oil bath may be heated by a fire applied directly to the retort, as in the drawing, or by heated pipes in the retort in contact with the bath, or the bath may be heated outside the retort and introduced into it at the desired temperature, or any other convenient means of heating may be used. Whatever method of heating is employed, it is necessary that the temperature be kept below the point at which destructive distillation or carbonization of the wood takes place, whereby the volatile products would be chemically changed and contaminated. With rosin oil as a bath, since it is liquid at ordinary temperatures, this may be done by introducing cold rosin oil, thereby regulating the temperature of the bath at will.

Third: The products are obtained pure and free from any contamination. This result is chiefly due to the fact that the material of the liquid bath (rosin oil) and the products (terpenes) are derived from a common source (resinous wood), and that the liquid bath has no characteristic that is incompatible with the products.

Fourth: During the process of distilling resinous woods to extract the volatile products, a quantity of rosin naturally exudes from the wood in melted form and mingles with the bath material. The advantage of rosin oil in this connection as a bath material over any other material liquid at ordinary temperatures is the formation of a simple mixture, which, by the further application of heat, may be distilled off as a single distillate, rosin oil, since both the rosin oil bath and the admixed rosin from the wood are thereby converted into the same substance, namely, rosin oil. The original rosin oil of the bath thus recovered, augmented by the rosin oil thus produced from the rosin exuding from the wood, may, if desired, be utilized as the bath for subsequent operations. The bath may be distilled, as above described, in the same retort after removing the wood, or preferably, may be withdrawn and distilled in a separate apparatus. The distillation or removal of the bath is done whenever the rosin exudes to an extent to render the bath non-liquid at ordinary temperatures. By maintaining a circulation of the bath, keeping a supply of rosin oil flowing into the retort, and withdrawing the mixture of rosin and rosin oil, the proportion of rosin in the mixture may be kept at a minimum, and the bath maintain its character of fluidity at ordinary temperatures.

While the relative amounts of wood and rosin oil bath are not material to the theory of my processes, in practice, it is advisable to have a sufficient quantity of rosin oil bath to completely immerse the wood. Quicker results may be obtained if the proportion of rosin oil is in excess of the quantity of wood. If the quantity of rosin oil surrounding the wood is very small, it will be found that the large amount of wood will quickly absorb the heat of the bath, resulting in a difficulty in maintaining the required temperature of the bath. If, on the other hand, the amount of rosin oil is greatly in excess of the quantity of wood, the proportionately small quantity of resultant products would tend to render practically unprofitable an operation in such proportions. In practice, I preferably use an amount of rosin oil approximately equal in volume to the amount of wood, but the relative amounts may be varied at pleasure.

Having thus described my invention what I claim and desire to secure by Letters Patent is,—

The herein-described process of obtaining turpentine and other products from resinous and terebinthine wood, consisting of immersing the wood in a bath of rosin oil and heating said bath to a temperature higher than that at which turpentine boils, and lower than that at which rosin oil boils, and collecting and condensing the volatilized product.

In testimony whereof I affix my signature in presence of two witnesses.

FREDERICK A. KUMMER.

Witnesses:
   G. O. STROTHER,
   A. A. HYDE.